Feb. 8, 1944.   O. S. BURKHOLDER   2,341,080
FOOT REST
Filed June 14, 1941
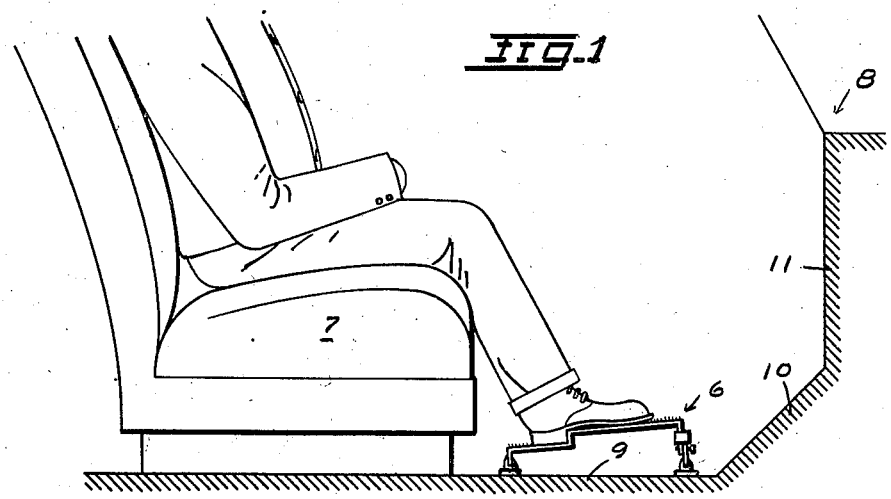
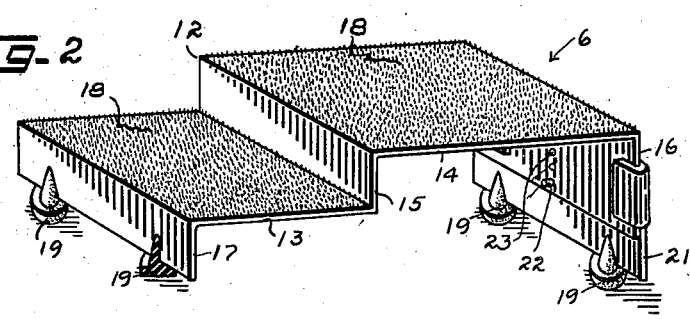
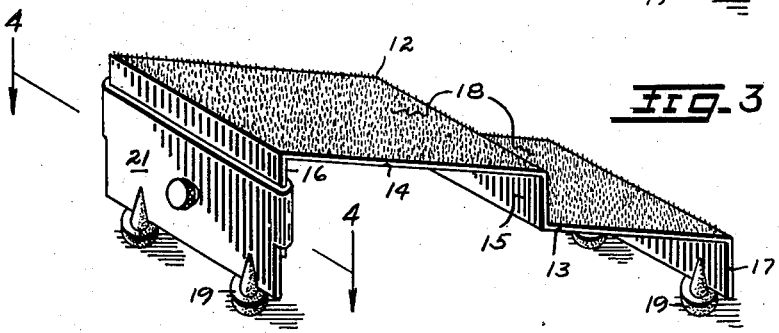
INVENTOR
OSCAR S. BURKHOLDER
BY Henry N. Young
ATTORNEY Patented Feb. 8, 1944

2,341,080

UNITED STATES PATENT OFFICE 2,341,080

FOOTREST

Oscar Smedley Burkholder, Oakland, Calif.

Application June 14, 1941, Serial No. 398,091

3 Claims. (Cl. 155—169)

The invention relates to a foot rest for use by an occupant of a seat, and the present application includes the disclosure of my application Ser. No. 361,395 filed October 16, 1940, for an Automobile foot board.

A primary object is to provide a foot rest for promoting the comfort of short-legged persons occupying seats in vehicles, restaurants, theatres, homes, etc. where the usual seat height is appropriate only for adults of average height.

Another object is to provide a foot rest of the character described having a heel stop for engagement by the heels of a user's shoes to prevent a forward movement of the feet upon the foot rest and so provide for a holding of the person's body against its forward movement on the seat with which the foot rest is being associatively used.

A further object is to provide a foot rest of the type described which may be retained in set position without being attached to a seat or to the floor adjacent the seat.

The invention possesses other objects and features of advantage, some of which, with the foregoing, will be set forth or be apparent in the following description of a typical embodiment thereof, and in the accompanying drawing, in which, Figure 1 is a fragmentary elevation showing a foot rest embodying the features of my invention in use adjacent a fixed seat of an automobile.

Figure 2 is a right-side and rear perspective view of the foot rest.

Figure 3 is a left-side and front perspective view of the foot rest.

Figure 4 is an enlarged section taken in a horizontal plane at the line 4—4 in Figure 3.

While of use elsewhere, the present foot rest unit 6 is particularly shown as in use by an occupant of a seat which is low enough to require a forward disposal of an adult occupant's feet for resting on the floor in front of the seat. Seats of the present type are commonly provided in automobiles and other vehicles, and the present seat 7 is shown as comprising a front seat of a diagrammatically indicated automobile body 8 providing a seat-supporting floor 9 having a foot board 10 sloping upwardly from its forward end to an upright dash board 11 of the body; the arrangement is usually such that average-sized adult occupants of the seat may place their feet flat against the dash board for more or less bracing themselves against forward movement in the seat while avoiding the less comfortable right-angle bending of the legs at the knee. By the use of the present foot rest 6, the equivalent of a foot board is provided for short-legged persons in the seat 7, or for the occupants of any seats not having foot boards associated with them.

As shown, the present foot rest provides a stepped top 12 sloping upwardly from its rear edge and having rear and front portions 13 and 14 connected by a riser portion 15 in a substantially rigid structure, the top portions 13 and 14 being generally parallel. The top 12 comprises an intermediate portion of a plate element which has integral front and rear portions 16 and 17 thereof turned downwardly for use as legs in supporting the top in sloping relation to the supporting floor; this element may be of metal or other generally rigid material which is formable to the disclosed shape, as by bending a blank of the material in sheet form or forming the material in a casting mold or die. The upper faces of the parts 13 and 14 may be provided with a suitable soft surface covering 18; as indicated, the cover 18 may comprise a facing of a cellulosic nap directly adherent to the top faces of the rest plate.

The plate portion 16 mounts feet 19 of rubber or the like at its lower edge for frictionally engaging the floor 9. The rear plate portion 17, if of appropriate length, may also carry floor-engaging friction feet 19. The disclosed feet 19 have disc-shaped lower floor-engaging portions from which generally conical stem-like portions extend axially, the latter portions being shown as diametrically and axially slotted to closely receive the lower edges of the plate portions 16 or 17 for mounting the feet thereon.

To best meet the varying conditions caused by different seat heights and/or the size of the seat occupant, means are preferably provided for adjusting the angularity of the foot rest top to the supporting floor. As shown, a member 21 telescopically engages the front portion 16 in adjustable relation thereto as an extension thereof whereby the height of the rest may be adjusted at its front. The member 21 mounts floor-engaging feet 19 at its lower edge, a spring-pressed pin 22 mounted on the member may selectively engage holes 23 of a line thereof provided in the portion 16 for securing the member and portion in adjusted relation; it will be understood that the member 21 and portion 16 jointly provide, and function as, a leg of adjustable length.

The angularity of the foot rest portions 16 and 17 to the top portions 13 and 15 respectively is preferably such that these parts are generally perpendicular to the plane of support provided by the feet 19. As particularly illustrated, the member 21 is formed of a flat plate of substantially rigid material such as that used for the supported structure and having side extensions turned back opposite the back of the plate to provide guideways in which side edge portions of the part 16 are slidably disposed to provide the telescopic engagement of the member and portion.

With the present foot rest disposed on the floor in front of a seat, an occupant of the seat may place his feet upon the foot rest top with the fronts of his shoe heels engaging the riser 15 as a stop to secure the feet against sliding forwardly on the rest; this is an important feature for vehicles, since a sudden slowing down or stopping of a vehicle tends to move the occupants of its seats forwardly, and the heel stop provided may be utilized to resist the movement which is urged. An appropriate inclination adjustment of the sloping top 12 would, of course, be made to best provide for the comfort of the user. The present foot rest, being usable without positive attachment to a floor or seat, is adapted for use as a free unit with different seats and by different persons at appropriate distances from the seats.

Having the present foot rest top 12 shaped of a plate of heat-conducting material, as metal, the same may advantageously receive a heat emanating unit in the space beneath the top, or be placed over a floor heater of the flush type to also act as a foot warmer. Also, since the top 12 and the portions 16 and 17 are imperforate, the escape of heated air from beneath the top 12 is arranged to be entirely lateral of the unit to direct the air away from the body of the person using the rest.

From the foregoing description taken in connection with the accompanying drawing, the advantages of the construction and method of use will be readily understood by those skilled in the art to which the invention appertains. While I have described the features and use of a foot rest which I now consider to be a preferred embodiment of my invention, I desire to have it understood that the showing is primarily illustrative, and that such changes may be made, when desired, as fall within the scope of the following claims.

I claim:

1. A foot rest unit for disposal on a support surface and comprising a plate element having an intermediate portion thereof providing the top of the unit and formed with a vertical step thereacross as a heel stop means thereof, opposite end portions of the element being turned down in parallel relation to said step to provide support legs for the top, and a leg extension member adjustably engaged with a said leg for varying the effective length thereof to adjustably vary the angularity of the top with respect to the support surface.

2. A foot rest unit for disposal on a support surface in front of a seated person and comprising a plate element having an intermediate portion thereof providing the top of the unit, opposite end portions of the element being turned down to provide support legs for the top along the front and rear edges thereof, and a leg extension member adjustably engaged with a said leg for varying the effective length thereof to adjustably vary the angularity of the top with respect to the support surface.

3. A foot rest for unattached disposal on a floor for use by a seated person and comprising an inclined top for the simultaneous and independent resting thereon of both of the person's feet flat against its upper face and intermediately stepped across its width to provide a heel stop across it, support legs extending rigidly from said top for supporting it upon the floor in lines beneath the front and rear edges of the top, and means on the leg structure adjustable to adjust the relative angularity of the top to the floor.

OSCAR SMEDLEY BURKHOLDER.